United States Patent
Sugaya

(10) Patent No.: US 10,643,073 B2
(45) Date of Patent: May 5, 2020

(54) SYSTEM, METHOD, PROGRAM FOR DISPLAY ON WEARABLE TERMINAL

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/749,897

(22) PCT Filed: Apr. 28, 2017

(86) PCT No.: PCT/JP2017/016941
§ 371 (c)(1),
(2) Date: Feb. 2, 2018

(87) PCT Pub. No.: WO2018/198319
PCT Pub. Date: Nov. 1, 2018

(65) Prior Publication Data
US 2020/0019780 A1    Jan. 16, 2020

(51) Int. Cl.
*G06T 7/90*  (2017.01)
*G06K 9/00*  (2006.01)
(Continued)

(52) U.S. Cl.
CPC ......... *G06K 9/00671* (2013.01); *A01D 91/00* (2013.01); *G06F 3/012* (2013.01);
(Continued)

(58) Field of Classification Search
None
See application file for complete search history.

(56) References Cited

U.S. PATENT DOCUMENTS

| | | | |
|---|---|---|---|
| 2016/0049108 A1* | 2/2016 | Yajima | A63F 13/00 345/212 |
| 2016/0232621 A1* | 8/2016 | Ethington | G06Q 10/06315 |
| 2017/0278159 A1* | 9/2017 | Chung | G06Q 30/0609 |

FOREIGN PATENT DOCUMENTS

| | | |
|---|---|---|
| JP | 2005-92595 | 4/2005 |
| JP | 2011-192022 | 9/2011 |

(Continued)

OTHER PUBLICATIONS

Santana-Fernandez et al. "Design and Implementation of a GPS Guidance System for Agricultural Tractors Using Augmented Reality Technology", Sensors; Basel vol. 10, Iss. 11, (2010): 10435-10447. DOI:10.3390/s101110435 (Year: 2010).*

*Primary Examiner* — Tapas Mazumder
(74) *Attorney, Agent, or Firm* — Lex IP Meister, PLLC

(57) ABSTRACT

The present invention is to identify the type of the farm product in a view through the wearable terminal and display the expected harvest time on the display of a wearable terminal in augmented reality. The system for displaying the harvest time of a farm product on the display of a wearable terminal, includes: an image acquisition unit that acquires the image of a farm product in a view through the wearable terminal; an identification unit that analyzes the image and identifies the type of the farm product; a selection unit that selects a determination criterion according to the type; a determination unit that analyzes the image based on the determination criterion and determines the color and the size; an estimation unit that estimates the harvest time of the farm product based on the determination result; and a harvest time display unit that displays the estimated harvest time of the farm product seen through the display of the wearable terminal thereon in augmented reality.

12 Claims, 2 Drawing Sheets

(51) Int. Cl.
  *G06T 7/70*  (2017.01)
  *A01D 91/00*  (2006.01)
  *G06F 3/01*  (2006.01)
  *G06T 7/60*  (2017.01)
  *G10L 25/51*  (2013.01)
  *H04N 5/232*  (2006.01)

(52) U.S. Cl.
  CPC .................. *G06T 7/60* (2013.01); *G06T 7/70* (2017.01); *G06T 7/90* (2017.01); *G10L 25/51* (2013.01); *G06K 2209/17* (2013.01); *G06T 2207/30188* (2013.01); *G06T 2207/30244* (2013.01); *H04N 5/23222* (2013.01)

(56) References Cited

FOREIGN PATENT DOCUMENTS

JP  2015-177397    10/2015
KR     101810877 B1 *  1/2018  ....... B32B 17/10036

\* cited by examiner

SYSTEM FOR DISPLAY ON WEARABLE TERMINAL

DISPLAY OF WEARABLE TERMINAL

SYSTEM, METHOD, PROGRAM FOR DISPLAY ON WEARABLE TERMINAL

TECHNICAL FIELD

The present invention relates to a system, a method, and a program for display on a wearable terminal that display the estimated harvest time of a farm product seen through the display of the wearable terminal on this display in augmented reality.

BACKGROUND ART

Recently, the push for information technology and computerization has advanced in agriculture fields. For example, to remove troublesome entry tasks, a device that not only automatically collects information on farm works performed for a farm product but also provides reliable traceability information on a farm product is provided (Patent Document 1).

CITATION LIST

Patent Literature

Patent Document 1: JP 2005-92595A

SUMMARY OF INVENTION

However, the device of Patent Document 1 has the problem in which the harvest time of a farm product is unclear while farm works are being performed.

In view of the above-mentioned problems, an objective of the present invention is to provide a system, a method, and a program for display on a wearable terminal that identify the type of the farm product in a view through the wearable terminal and display the estimated harvest time on the display of a wearable terminal in augmented reality.

The first aspect of the present invention provides a system for displaying the harvest time of a farm product on the display of a wearable terminal, including:
  an image acquisition unit that acquires the image of a farm product in a view through the wearable terminal;
  an identification unit that analyzes the image and identifies the type of the farm product;
  a selection unit that selects a determination criterion according to the type;
  a determination unit that analyzes the image based on the determination criterion and determines the color and the size;
  an estimation unit that estimates the harvest time of the farm product based on the determination result; and
  a harvest time display unit that displays the estimated harvest time of the farm product seen through the display of the wearable terminal thereon in augmented reality.

The first aspect of the present invention provides a method for displaying the harvest time of a farm product on the display of a wearable terminal, including the steps of
  acquiring the image of a farm product in a view through the wearable terminal;
  analyzing the image and identifies the type of the farm product;
  selecting a determination criterion according to the type;
  analyzing the image based on the determination criterion and determining the color and the size;
  estimating the harvest time of the farm product based on the determination result; and
  displaying the estimated harvest time of the farm product seen through the display of the wearable terminal thereon in augmented reality.

The first aspect of the present invention provides a program causing a computer to execute the steps of
  acquiring the image of a farm product in a view through the wearable terminal;
  analyzing the image and identifies the type of the farm product;
  selecting a determination criterion according to the type;
  analyzing the image based on the determination criterion and determining the color and the size;
  estimating the harvest time of the farm product based on the determination result; and
  displaying the estimated harvest time of the farm product seen through the display of the wearable terminal thereon in augmented reality.

Since the estimated harvest time of a farm product can be displayed on the display of a wearable terminal, the harvest time of the farm product can be clarified while the farm work is being performed.

DESCRIPTION OF EMBODIMENTS

Embodiments of the present invention will be described below. However, this is illustrative only, and the technological scope of the present invention is not limited thereto.

The system for display on a wearable terminal of the present invention displays the estimated harvest time of a farm product seen through the display of the wearable terminal on this display in augmented reality. The wearable terminal provides a view, such as smart glasses or a head mounted display.

Figure 1:
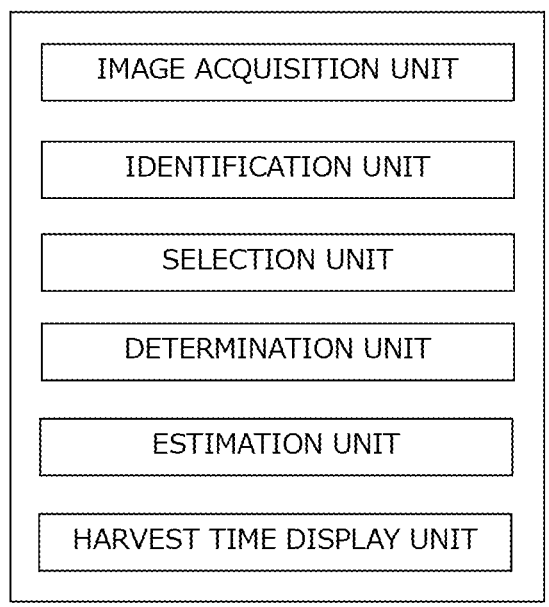
FIG. 1 shows a schematic diagram of the system for display on a wearable terminal.

A preferable embodiment of the present invention will be described below with reference to FIG. 1. FIG. 1 shows a schematic diagram of the system for display on a wearable terminal according to a preferable embodiment of the present invention.

As shown in FIG. 1, the system for display on a wearable terminal includes an image acquisition unit, an identification unit, a selection unit, a determination unit, an estimation unit, and a harvest time display unit that are achieved when the control unit reads a predetermined program. Even though not shown in the drawings, the system may further include a weather acquisition unit, a terminal position acquisition unit, a sound acquisition unit, a mode receiving unit, a detection unit, an action result display unit, an image direction acquisition unit, a calculation unit, a guideline display unit, and a selection receiving unit. These units may be of an application type, a cloud type, or the like. The above-mentioned units may each be achieved by a single computer or two or more computers (e.g., a server and a terminal).

The image acquisition unit acquires the image of a farm product displayed on the display of a wearable terminal. The image acquisition unit may acquire an image taken by the camera of a wearable terminal. The image may be taken by other devices other than a wearable terminal as long as it can be acquired. The image may be a moving image or a still image, preferably a moving image. If a guideline is displayed to take an image, the image taken according to the guideline may be acquired. Acquiring and analyzing only the image taken according to a guideline can efficiently identify the farm product.

The identification unit analyzes the image and identifies the type of a farm product. For example, the identification unit identifies the farm product as a cabbage, spinach, an orange, or a watermelon. If it takes a long time to identify the types of all the farm products in a view, the identification unit may identify a farm product at the center of a view through the wearable terminal as a target to be identified. Identifying only the farm product at the center of the view as a target to be identified can substantially reduce the time necessary for the identification. Moreover, machine learning may improve the accuracy of the image analysis. For example, the past images of farm products are used as teacher data for the machine learning. If calculating the position of a farm product, the identification unit may identify the type of the farm product based on the position and the image analysis.

The selection unit selects a determination criterion according to the type of the farm product. Specifically, since it differs depending on whether the farm product is a cabbage, spinach, an orange, or a watermelon, the determination criterion for estimating the harvest time should be selected. More specifically, for a watermelon, the determination criterion for estimating the harvest time may be based on the sound when the watermelon is tapped.

The determination unit analyzes the image based on the determination criterion and determines the color and the size. Since the color and the size to be seen differs depending on the type of the farm product, the color and the size are determined based on the determination criterion according to the type of the farm product. Specifically, for an orange, the determination criterion may be based on how much the skin is orange-colored and how much size the orange has grown to. For example, since a cabbage with the worm-eaten outer leaf has better quality, the worm eaten may be determined based on the color. If the sound of the farm product is acquired, the color and the size may be determined by analyzing the image, and then the acquired sound may be determined, based on the determination criterion. For example, for a watermelon, the sound when the watermelon is tapped is used to determine the harvest time. The sound may be a determination criterion for some farm products.

The estimation unit estimates the harvest time of the farm product based on the determination result. For example, the harvest time is estimated to be after three days based on the determination result. If the harvest time cannot be accurately estimated based on the determination result, the harvest time may be estimated to fall into a range, for example, after three to five days. Moreover, there may be a lag of the harvest time based on the weather. If the weather forecast is acquired, the harvest time of the farm product may be estimated based on the determination result and the weather forecast. If the mode of the harvest time is received, the harvest time may be estimated in the mode for the farm product based on the determination result. Moreover, machine learning may improve the accuracy of the estimation. For example, the past harvest times are used as teacher data for the machine learning.

Figure 2:
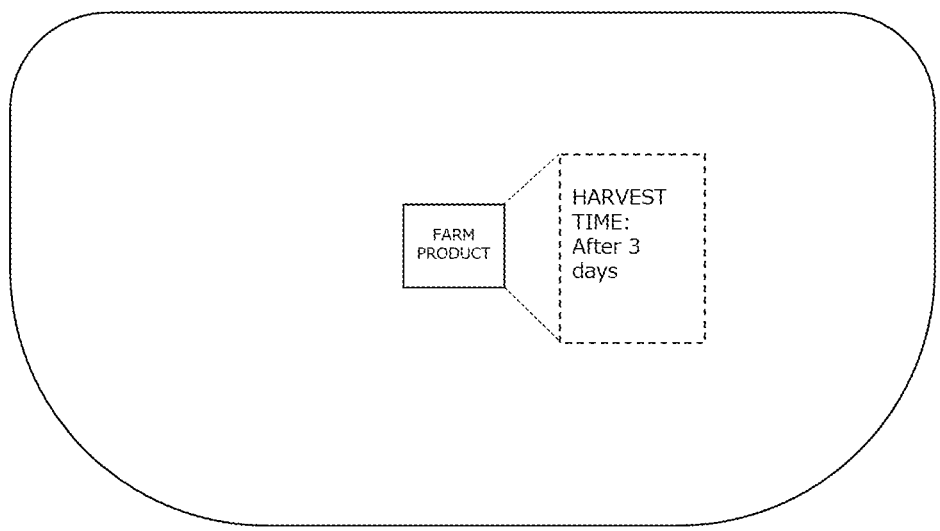
FIG. 2 shows one example in which the estimated harvest time of a farm product seen through the display of a wearable terminal is displayed on this display in augmented reality.

The harvest time display unit displays the estimated harvest time of a farm product seen through the display of a wearable terminal on this display in augmented reality. As shown in FIG. 2, the harvest time that is enclosed by a broken line is displayed on this display in augmented reality for the farm product seen through the display of a wearable terminal that is enclosed by a solid line. For understanding, realities are enclosed by a solid line, and augmented realities are enclosed by a broken line, herein. Displaying the harvest time enclosed by a broken line for the farm product enclosed by a solid line that is seen through the display in augmented reality makes it to clear about when the harvest time of the farm product is while the farm work is being performed. The harvest time displayed in augmented reality may be overlapped with the farm product seen through the display. However, this makes the farm product hard to be seen. Thus, the display of the harvest time may be turned on and off. If the selection of the farm product to be displayed is received, the harvest time may be displayed on the display of a wearable terminal in augmented reality together with the selected object seen through the display.

The weather acquisition unit acquires the weather forecast for the place where the farm product is growing. The weather forecast may be acquired from an external database, for example, of the Meteorological Agency, etc., or may be stored in an internal database. The place where the farm product is growing can be known from the address, etc. If the position of the terminal is acquired, the weather forecast for the position of the terminal may be acquired on the assumption that the position of the terminal is the place where the farm product is growing.

The terminal position acquisition unit acquires the position of a wearable terminal. For example, the position of the terminal can be acquired from the GPS (Global Positioning System) of a wearable terminal. The position of the terminal may be acquired in other ways other than these.

The sound acquisition unit acquires the sound of the farm product from the microphone of a wearable terminal. For example, for a watermelon, the sound when the watermelon is tapped is used to determine the harvest time. The sound may be a determination criterion for some farm products.

The mode receiving unit receives the selection of the mode of the harvest time. Examples of the mode of the harvest time include a delicious harvest time mode, a high price harvest time mode, a harvest time mode considered for the transportation period, and a harvest time mode for drying a farm product. There are various modes other than these.

The detection unit detects the action to be taken in the displayed harvest time. The action to be taken in the harvest time can be detected by acquiring and analyzing the image of the farm work. For example, whether or not the farm product is harvested in the harvest time is detected. The action to be taken in the harvest time may be detected based on the information from the sensor of a wearable terminal or the sensor that a person who performs the farm work wears.

The action result display unit displays the result of the action taken for the farm product seen through the display of a wearable terminal on this display in augmented reality. For example, if the action to erase the harvest time is detected, the display of the harvest time may be erased. For example, if the action to open the link associated with the harvest time is detected, the link may be opened. Of course, the other actions may be taken.

The image direction acquisition unit acquires the image direction of the wearable terminal. For example, if an image is taken with a wearable terminal, the image direction can be acquired from the geomagnetic sensor or the acceleration sensor of the wearable terminal. The image direction may be acquired in other ways other than these.

The calculation unit calculates the position of the farm product based on the position of the terminal and the image direction. If the position of the terminal and the image direction are clear, the position of the imaged farm product can be calculated.

The guideline display unit displays a guideline to take an image of the farm product on the display of a wearable terminal in augmented reality. For example, the guideline may be displayed together with a frame, a cross, etc. Taking the image according to the guideline makes the image analysis easy.

The selection receiving unit receives the selection of the farm product seen through the display of a wearable terminal. For example, the farm product seen through the display of a wearable terminal during the fixed time may be displayed to receive the selection of the farm product. For example, the selection of the farm product may be received by touching a farm product seen through the display of a wearable terminal. For example, the selection of the farm product may be received by moving the cursor to the farm product seen through the display of a wearable terminal.

Process Behavior

The method for display on a wearable terminal will be described below. The method for display on a wearable terminal of the present invention displays the estimated harvest time of a farm product seen through the display of the wearable terminal on this display in augmented reality.

The method for display on a wearable terminal includes an image acquisition step, an identification step, a selection step, a determination step, an estimation step, and a harvest time display step. Even though not shown in the drawings, the method may further include a weather acquisition step, a terminal position acquisition step, a sound acquisition step, a mode receiving step, a detection step, an action result display step, an image direction acquisition step, a calculation step, a guideline display step, and a selection receiving step.

The image acquisition step acquires the image of a farm product displayed on the display of a wearable terminal. The image acquisition unit may acquire an image taken by the camera of a wearable terminal. The image may be taken by other devices other than a wearable terminal as long as it can be acquired. The image may be a moving image or a still image, preferably a moving image. If a guideline is displayed to take an image, the image taken according to the guideline may be acquired. Acquiring and analyzing only the image taken according to a guideline can efficiently identify the farm product.

The identification step analyzes the image and identifies the type of a farm product. For example, the identification unit identifies the farm product as a cabbage, spinach, an orange, or a watermelon. If it takes a long time to identify the types of all the farm products in a view, the identification unit may identify a farm product at the center of a view through the wearable terminal as a target to be identified. Identifying only the farm product at the center of the view as a target to be identified can substantially reduce the time necessary for the identification. Moreover, machine learning may improve the accuracy of the image analysis. For example, the past images of farm products are used as teacher data for the machine learning. If calculating the position of a farm product, the identification unit may identify the type of the farm product based on the position and the image analysis.

The selection step selects a determination criterion according to the type of the farm product. Specifically, since it differs depending on whether the farm product is a cabbage, spinach, an orange, or a watermelon, the determination criterion for estimating the harvest time should be selected. More specifically, for a watermelon, the determination criterion for estimating the harvest time may be based on the sound when the watermelon is tapped.

The determination step analyzes the image based on the determination criterion and determines the color and the size. Since the color and the size to be seen differs depending on the type of the farm product, the color and the size are determined based on the determination criterion according to the type of the farm product. Specifically, for an orange, the determination criterion may be based on how much the skin is orange-colored and how much size the orange has grown to. For example, since a cabbage with the worm-eaten outer leaf has better quality, the worm eaten may be determined based on the color. If the sound of the farm product is acquired, the color and the size may be determined by analyzing the image, and then the acquired sound may be determined, based on the determination criterion. For example, for a watermelon, the sound when the watermelon is tapped is used to determine the harvest time. The sound may be a determination criterion for some farm products.

The estimation step estimates the harvest time of the farm product based on the determination result. For example, the harvest time is estimated to be after three days based on the determination result. If the harvest time cannot be accurately estimated based on the determination result, the harvest time may be estimated to fall into a range, for example, after three to five days. Moreover, there may be a lag of the harvest time based on the weather. If the weather forecast is acquired, the harvest time of the farm product may be estimated based on the determination result and the weather forecast. If the mode of the harvest time is received, the harvest time may be estimated in the mode for the farm product based on the determination result. Moreover, machine learning may improve the accuracy of the estimation. For example, the past harvest times are used as teacher data for the machine learning.

The harvest time display step displays the estimated harvest time of a farm product seen through the display of a wearable terminal on this display in augmented reality. As shown in FIG. 2, the harvest time that is enclosed by a broken line is displayed on this display in augmented reality for the farm product seen through the display of a wearable terminal that is enclosed by a solid line. For understanding, realities are enclosed by a solid line, and augmented realities are enclosed by a broken line, herein. Displaying the harvest time enclosed by a broken line for the farm product enclosed by a solid line that is seen through the display in augmented reality makes it to clear about when the harvest time of the farm product is while the farm work is being performed. The harvest time displayed in augmented reality may be overlapped with the farm product seen through the display. However, this makes the farm product hard to be seen. Thus, the display of the harvest time may be turned on and off. If the selection of the farm product to be displayed is received, the harvest time may be displayed on the display of a wearable terminal in augmented reality together with the selected object seen through the display.

The weather acquisition step acquires the weather forecast for the place where the farm product is growing. The weather forecast may be acquired from an external database, for example, of the Meteorological Agency, etc., or may be stored in an internal database. The place where the farm product is growing can be known from the address, etc. If the position of the terminal is acquired, the weather forecast for the position of the terminal may be acquired on the assumption that the position of the terminal is the place where the farm product is growing.

The terminal position acquisition step acquires the position of a wearable terminal. For example, the position of the terminal can be acquired from the GPS (Global Positioning System) of a wearable terminal. The image direction may be acquired in other ways other than these.

The sound acquisition step acquires the sound of the farm product from the microphone of a wearable terminal. For example, for a watermelon, the sound when the watermelon is tapped is used to determine the harvest time. The sound may be a determination criterion for some farm products.

The mode receiving step receives the selection of the mode of the harvest time. Examples of the mode of the harvest time include a delicious harvest time mode, a high price harvest time mode, a harvest time mode considered for the transportation period, and a harvest time mode for drying a farm product. There are various modes other than these.

The detection step detects the action to be taken in the displayed harvest time. The action to be taken in the harvest time can be detected by acquiring and analyzing the image of the farm work. For example, whether or not the farm product is harvested in the harvest time is detected. The action to be taken in the harvest time may be detected based on the information from the sensor of a wearable terminal or the sensor that a person who performs the farm work wears.

The action result display step displays the result of the action taken for the farm product seen through the display of a wearable terminal on this display in augmented reality. For example, if the action to erase the harvest time is detected, the display of the harvest time may be erased. For example, if the action to open the link associated with the harvest time is detected, the link may be opened. Of course, the other actions may be taken.

The image direction acquisition step acquires the image direction of the wearable terminal. For example, if an image is taken with a wearable terminal, the image direction can be acquired from the geomagnetic sensor or the acceleration sensor of the wearable terminal. The image direction may be acquired in other ways other than these.

The calculation step calculates the position of the farm product based on the position of the terminal and the image direction. If the position of the terminal and the image direction are clear, the position of the imaged farm product can be calculated.

The guideline display step displays a guideline to take an image of the farm product on the display of a wearable terminal in augmented reality. For example, the guideline may be displayed together with a frame, a cross, etc. Taking the image according to the guideline makes the image analysis easy.

The selection receiving step receives the selection of the farm product seen through the display of a wearable terminal. For example, the farm product seen through the display of a wearable terminal during the fixed time may be displayed to receive the selection of the farm product. For example, the selection of the farm product may be received by touching a farm product seen through the display of a wearable terminal. For example, the selection of the farm product may be received by moving the cursor to the farm product seen through the display of a wearable terminal.

To achieve the means and the functions that are described above, a computer (including a CPU, an information processor, and various terminals) reads and executes a predetermined program. For example, the program may be an application installed in a computer, may be provided through Software as a Service (SaaS), specifically, from a computer through a network, or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

As the specific algorithm of the above-mentioned machine learning, the nearest neighbor algorithm, the naive Bayes algorithm, the decision tree, the support vector machine, the reinforcement learning, etc., may be used. Furthermore, the machine learning may be the deep learning that generates the feature amount for learning by using the neural network.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

What is claimed is:

1. A system for displaying a harvest time of a farm product on a display of a wearable terminal, comprising:
    a processor that:
        acquires an image of the farm product in a view through the wearable terminal;
        analyzes the image and identifies a type of the farm product;
        selects a determination criterion according to the type, the determination criterion including a color criterion and a size criterion;
        analyzes the image based on the determination criterion and determines a color and a size;
        estimates the harvest time of the farm product based on the determined color and size; and
        displays the estimated harvest time of the farm product seen through the display of the wearable terminal thereon in augmented reality.

2. The system according to claim 1, wherein the processor identifies the farm product at a center of the view through the wearable terminal as a target to be identified.

3. The system according to claim 1, wherein the processor acquires a weather forecast for a place where the farm product is growing, and estimates the harvest time of the farm product based on the determined color and size and the acquired weather forecast.

4. The system according to claim 3, wherein the processor acquires a position of the wearable terminal, and acquires the weather forecast for the position of the terminal on assumption that the position of the terminal is the place where the farm product is growing.

5. The system according to claim 1, wherein the determination criterion further includes a sound criterion,
    wherein the processor acquires a sound of the farm product from a microphone of a wearable terminal, and
    wherein the color and the size are determined by analyzing the image, and then the acquired sound is determined, based on the determination criterion.

6. The system according to claim 1, wherein the processor receives a selection of a mode of the harvest time, and estimates the harvest time in the mode for the farm product based on the determined color and size.

7. The system according to claim 1, wherein the processor:
a action to be taken in the displayed harvest time; and
displays a result of the action taken for the farm product seen through the display of the wearable terminal thereon in the augmented reality.

8. The system according to claim 1, wherein the processor:
acquires a position of the wearable terminal;
acquires an image direction of the wearable terminal;
calculates a position of the farm product based on the position of the terminal and the image direction; and
identifies the type of the farm product based on the position and the image analysis.

9. The system according to claim 1, wherein the processor displays a guideline to take an image of the farm product on the display of the wearable terminal in augmented reality, and acquires the image taken according to the guideline.

10. The system according to claim 1, wherein the processor receives a selection on an object of the farm product seen through the display of the wearable terminal, and displays the harvest time on the display of the wearable terminal in augmented reality together with the selected object seen through the display.

11. A method for displaying a harvest time of a farm product on a display of a wearable terminal, comprising the steps of:
acquiring an image of the farm product in a view through the wearable terminal;
analyzing the image and identifies a type of the farm product;
selecting a determination criterion according to the type, the determination criterion including a color criterion and a size criterion;
analyzing the image based on the determination criterion and determining a color and a size;
estimating the harvest time of the farm product based on the determined color and size; and
displaying the estimated harvest time of the farm product seen through the display of the wearable terminal thereon in augmented reality.

12. A non-transitory computer-readable medium that stores a program causing a computer to execute the steps of:
acquiring an image of a farm product in a view through a wearable terminal;
analyzing the image and identifies a type of the farm product;
selecting a determination criterion according to the type, the determination criterion including a color criterion and a size criterion;
analyzing the image based on the determination criterion and determining a color and a size;
estimating a harvest time of the farm product based on the determined color and size; and
displaying the estimated harvest time of the farm product seen through the display of the wearable terminal thereon in augmented reality.

\* \* \* \* \*